United States Patent
Taoka et al.

(10) Patent No.: US 8,351,386 B2
(45) Date of Patent: Jan. 8, 2013

(54) BASE STATION APPARATUS IN MOBILE COMMUNICATION SYSTEM, METHOD FOR USE IN BASE STATION APPARATUS, AND METHOD AND APPARATUS FOR GENERATING CQI CORRECTION TABLE

(75) Inventors: Hidekazu Taoka, Tokyo (JP); Jianchi Zhu, Beijing (CN); Xiaoming She, Beijing (CN); Lan Chen, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 40 days.

(21) Appl. No.: 12/680,585

(22) PCT Filed: Sep. 26, 2008

(86) PCT No.: PCT/JP2008/067521
§ 371 (c)(1),
(2), (4) Date: Jun. 28, 2010

(87) PCT Pub. No.: WO2009/044685
PCT Pub. Date: Apr. 9, 2009

(65) Prior Publication Data
US 2010/0296462 A1 Nov. 25, 2010

(30) Foreign Application Priority Data

Oct. 1, 2007 (JP) .................................. 2007-258112

(51) Int. Cl.
*H04W 4/00* (2009.01)
(52) U.S. Cl. .......... 370/329; 370/338; 370/341; 370/348
(58) Field of Classification Search .................. 370/235, 370/329, 333, 338, 348, 349; 375/262; 455/69
See application file for complete search history.

(56) References Cited

U.S. PATENT DOCUMENTS

| 2004/0190486 A1* | 9/2004 | Oshiba ........................... 370/349 |
| 2005/0053038 A1* | 3/2005 | Kimura ........................ 370/333 |
| 2006/0105717 A1 | 5/2006 | Kwon et al. |

(Continued)

FOREIGN PATENT DOCUMENTS

JP    2002-112328 A    4/2002

(Continued)

OTHER PUBLICATIONS

International Search Report w/translation from PCT/JP2008/067521 dated Jan. 6, 2009 (4 pages).

(Continued)

*Primary Examiner* — Hassan Kizou
*Assistant Examiner* — Toan Nguyen
(74) *Attorney, Agent, or Firm* — Osha Liang LLP (57) ABSTRACT

A base station apparatus includes a correction unit for correcting a CQI reported from a user apparatus and a scheduler for scheduling based on the corrected CQI. The correction unit uses a correction table to correct the CQI such that if the reported CQI is poor, the CQI is slightly reduced, and otherwise, the CQI is significantly reduced. One method of generating the correction table includes deriving a first SINR in consideration of the number of interference users less than (n−1) and a second SINR in consideration of the number of interference users equal to (n−1) to explore a distribution of the second SINR to the first SINR. In this method, correspondence between the first SINR and the second SINR is determined based on the distribution to generate the correction table.

7 Claims, 7 Drawing Sheets

U.S. PATENT DOCUMENTS

| | | | |
|---|---|---|---|
| 2006/0203727 A1* | 9/2006 | Aizawa et al. | 370/235 |
| 2007/0082619 A1* | 4/2007 | Zhang et al. | 455/69 |
| 2008/0165875 A1* | 7/2008 | Mundarath et al. | 375/262 |

FOREIGN PATENT DOCUMENTS

| | | |
|---|---|---|
| JP | 2003-264490 A | 9/2003 |
| JP | 2005-521358 A | 7/2005 |
| WO | 03/085876 A1 | 10/2003 |
| WO | 2005/004376 A1 | 1/2005 |
| WO | 2005/125262 A1 | 12/2005 |
| WO | 2006/065181 A1 | 6/2006 |
| WO | 2006116704 A2 | 11/2006 |

OTHER PUBLICATIONS

Written Opinion from PCT/JP2008/067521 dated Jan. 6, 2009 (5 pages).

3GPP TSG RAN WG1 Meeting #47bis, R1-070236; "Precoding for E-UTRA downlink MIMO"; LG Electronics et al.; Sorrento, Italy; Jan. 15-19, 2007 (3 pages).

TSG RAN WG1 meeting #49bis, R1-072983; "Channel Quality Indicator (CQI) Reporting for LTE MU-MIMO"; Orlando, Florida (US); Jun. 25-29, 2007 (11 pages).

NTT DoCoMo et al., "Investigation on Precoding Schemes for MU-MIMO in E-UTRA Downlink" 3GPP Draft; R1-072957 DL MU-MIMO, 3rd Generation Partnership Project (3GPP), Mobile Competence Centre; 650, Route Des Lucioles; F-06921 Sophia-Antipolis Cedex; France, vol. RAN WG1, no. Orlando, USA: 20070620, Jun. 20, 2007.

Extended European Search Report for Application No. 08835917.9-2415, mailed on Oct. 25, 2010 (18 pages).

Extended Search Report for European Application No. 12153244.4 dated Mar. 28, 2012 (13 pages).

Japanese Office Action for Application No. 2007-258112, mailed on Jul. 10, 2012 (5 pages).

* cited by examiner

| SINR(dB) | SINR'(dB) | OFFSET |
|---|---|---|
| −10 | −10 | 0 |
| 0 | −0.5 | −0.5 |
| 5 | 3.8 | −1.2 |
| 10 | 7.2 | −2.8 |
| 15 | 9.9 | −5.1 |
| 20 | 12.0 | −8.0 |
| 25 | 14.0 | −11.0 |
| 30 | 16.7 | −13.3 |
| 35 | 19.9 | −15.1 |
| 40 | 22.5 | −17.5 |

BASE STATION APPARATUS IN MOBILE COMMUNICATION SYSTEM, METHOD FOR USE IN BASE STATION APPARATUS, AND METHOD AND APPARATUS FOR GENERATING CQI CORRECTION TABLE

TECHNICAL FIELD

The present invention relates to the technical field of mobile communications and more particularly relates to a base station apparatus for a SDMA (Spatial Division Multiplex Access) scheme or a multiple user MIMO (Multiple Input Multiple Output) scheme, a method for use in the base station apparatus, and a method and an apparatus for generating a CQI correction table.

BACKGROUND ART

A MIMO scheme relates to multiple antenna based communications designed to improve the speed and/or quality of transmitted signals by using multiple antennas in communications. Downlink communications with multiple users in accordance with the MIMO scheme is called a "downlink multiple user MIMO" scheme or a "SDMA (Spatial Division Multiplex Access)" scheme. In the downlink multiple user MIMO scheme, a precoding scheme is utilized. The precoding scheme is a technique for transmitting signals to communication counterparts with directivity controlled beams by copying a transmission signal stream, synthesizing each of the copied streams with an appropriate weight and transmitting the resulting streams. The weights for use in the precoding scheme may be referred to as transmission weights, precoding vectors or precoding matrices.

Figure 1:
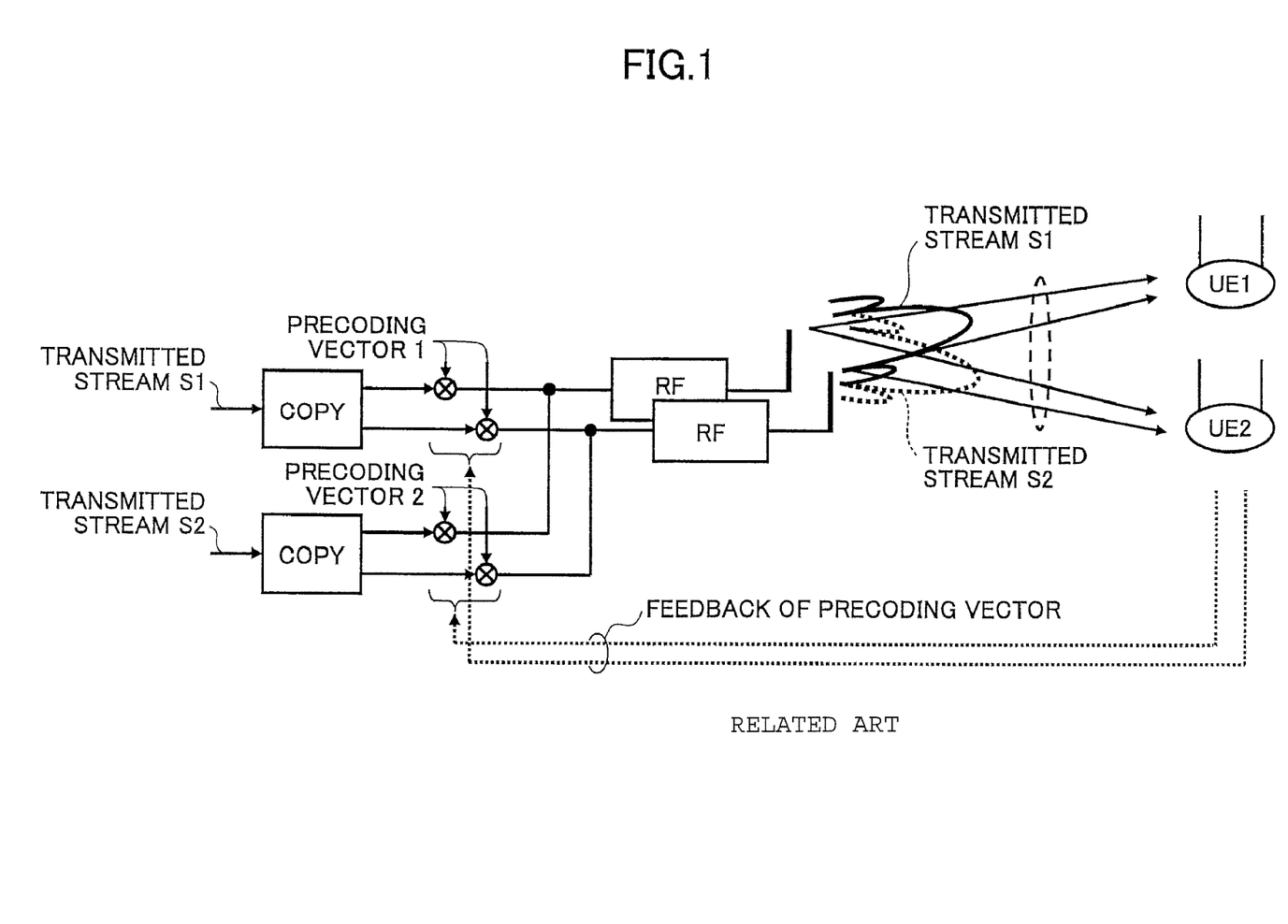
FIG. 1 schematically illustrates typical precoding.

FIG. 1 schematically illustrates a typical precoding operation. Each of two transmitted streams 1, 2 is duplicated at a copying unit, and precoding vectors are multiplied with the duplicated streams. After the resulting streams are synthesized with each other, the synthesized streams are transmitted. Stream S1 is transmitted to a first user apparatus UE1, and stream S2 is transmitted to a second user apparatus UE2. The precoding vectors are controlled adaptively to be more appropriate values based on feedbacks from the receiver side (user apparatuses). The precoding technique is described in detail in a document 3GPP R1-070236, "Precoding for E-UTRA downlink MIMO", LG Electronics, Samsung and NTT-DoCoMo, for example.

Meanwhile, in the next generation mobile communication systems such as LTE (Long Term Evolution) systems being successors of the third generation mobile communication systems, one or more resource blocks or resource units are assigned to user apparatuses in both uplinks and downlinks for communications. The term "user apparatus" used herein includes not only a mobile station but also a fixed station. The resource blocks are shared among a large number of user apparatuses in a system. Channels shared in downlinks are referred to as PDSCHs (Physical Downlink Shared Channels). On the other hand, channels shared in uplinks are referred to as PUSCHs (Physical Uplink Shared Channels). A base station apparatus (eNB) determines which resource block is assigned to which of multiple user apparatuses in what transmission format for each subframe (or transmission time interval (TTI)) corresponding to 1 ms, for example. This process is called scheduling. The transmission format is determined through specifications for a data modulation scheme and a data size (or a channel coding scheme), and a scheme for appropriately modifying the transmission formats is called an AMC (Adaptive Modulation and Coding) scheme. In the downlink, the base station apparatus uses one or more resource blocks to transmit a PDSCH to a user apparatus selected through the scheduling. In the uplink, a user apparatus selected through the scheduling uses one or more resource units to transmit a PUSCH to the base station. Information regarding the uplink scheduling and the downlink scheduling is transmitted to the user apparatuses in each subframe (signaling). Control channels used for this signaling are referred to as PDCCH (Physical Downlink Control Channels) or DL-L1/L2 control channels.

The determined transmission formats and the radio resource assignment are modified depending on radio transmission states (channel states). The downlink channel state is measured at user apparatuses and periodically transmitted to the base station, for example, as a CQI (Channel Quality Indicator). The uplink channel state is measured at the base station based on reception quality of an uplink sounding reference signal (UL Sounding RS). The determined transmission formats and the radio resource assignment may directly affect system throughput. Thus, it is desirable that the base station can comprehend the channel states as accurately as possible.

Meanwhile, in the CQI measurement in the user apparatuses, the reception quality of downlink reference symbols (DL-RSs) may be represented as one of several tens of levels of reception SINR (Signal to Interference Noise Ratio), for example, and the CQI may be derived by determining the quantization level of the reception SINR. In general, the reception SINR is represented as a ratio of desired signal power to undesired signal power, and the SINR measurements may vary depending on selection of the undesired signal power. A document 3GPP R1-072983, "Channel Quality Indicator (CQI) Reporting for LTE MU-MIMO", Nokia, TSG RAN WG1 meeting #49bis Orlando, Fla. (US), Jun. 25-29, 2007 discloses calculation examples regarding how the measurements vary.

In the selection of the undesired signal power, the reception quality measurement may be significantly affected depending on whether or how user apparatuses other than a user apparatus of interest are taken into account. For example, it is assumed that two user apparatuses UE2, UE3 other than a user apparatus UE1 of interest and streams S1, S2 and S3 are transmitted from a base station to the user apparatuses UE1, UE2 and UE3, respectively. For convenience sake, it is assumed that the number of interference users considered in reception signal quality measurement at user apparatuses is equal to (m−1) and the number of beams transmitted in a spatial multiplexing manner from several antennas of the base station is equal to n. Taking into account the other user apparatuses UE2, UE3, SINR for the user apparatus UE1 can be formulated as follows, $$SINR=P1/(P2+P3+N) \quad (A1).$$

In this case, n=3 and (m−1)=2 where n=m. In the formula, P1 represents reception power of the stream S1 at the UE1, P2 represents interference power with the UE1 due to the stream S2, P3 represents interference power with the UE1 due to the stream S3, and N represents a noise signal component.

If only one of the other user apparatuses is taken into account, the SINR for the user apparatus UE1 can be formulated as follows, $$SINR=P1/(P2+N) \text{ or } P1/(P3+N) \quad (A2).$$

In this case, n=3 and (m−1)=1 where n≠m. In addition, if neither of the other user apparatuses is taken into account, the SINR for the user apparatus UE1 can be formulated as follows, $$\text{SINR} = P1/N \quad (A3).$$

In this case, n=3 and (m−1)=0 where n≠m.

Pilot signals (or reference symbols) arriving at the user apparatuses are orthogonal to each other. Thus, the reception signal quality of the pilot signals may be evaluated in the formula (A2) or (A3). However, data signals transmitted in PDSCHs are not orthogonal among different users, and accordingly evaluation by means of the formulae (A2) and (A3) may be inaccurate. For data signals, an interference signal component due to signals destined for the other users as represented by the formula (A1) cannot be ignored.

In order to report as accurate measurements of channel states to the base station as possible, all of the other user apparatuses may have to be taken into account, as represented by the formula (A1). In this case, however, different measurement methods for the reception signal quality have to be applied depending on which multiple user MIMO (MU-MIMO) based communication or single user MIMO (SU-MIMO) based communication is utilized. This is the reason why other users are not taken into account for the reception quality measurement in the SU-MIMO scheme. However, such switches of the measurement method for reception signal quality in a user apparatus depending on either of the MU-MIMO scheme and the SU-MIMO scheme being applied increases system complexity and may not be practical. On the other hand, if a common measurement method for reception signal quality is applied to the MU-MIMO scheme and the SU-MIMO scheme, accurate CQIs cannot be comprehended at the base station.

DISCLOSURE OF INVENTION

Problem to be Solved by the Invention

The present invention addresses the above-mentioned problems. One object of the present invention is to correct reception signal quality reported in uplinks appropriately in cases where the number (m−1) of interference users considered in reception signal quality measurement at a user apparatus is not equal to the number n of beams transmitted in a spatial multiplexing manner from several antennas at a base station apparatus minus one, that is, (n−1).

Means for Solving the Problem

An aspect of the present invention relates to a base station apparatus including a correction unit for correcting a CQI reported from a user apparatus and a scheduler for scheduling based on the corrected CQI. The correction unit uses a correction table to correct the CQI such that if the reported CQI is poor, the CQI is slightly reduced, and otherwise, the CQI is significantly reduced. One method of generating the correction table includes deriving a first SINR in consideration of the number of interference users less than (n−1) and a second SINR in consideration of the number of interference users equal to (n−1) to explore a distribution of the second SINR to the first SINR. In this method, correspondence between the first SINR and the second SINR is determined based on the distribution to generate the correction table.

Advantage of the Invention

According to the present invention, in the cases where the number (m−1) of interference users considered in reception signal quality measurement at a user apparatus is not equal to the number n of beams transmitted in a spatial multiplexing manner from several antennas at a base station apparatus minus one, that is, (n−1), the reception signal quality reported in uplinks can be appropriately corrected.

LIST OF REFERENCE SYMBOLS

UE: user apparatus
eNB: base station apparatus
CQI: Channel Quality Indicator
SINR: Signal to Interference Noise Ratio

BEST MODE FOR CARRYING OUT THE INVENTION

A base station apparatus according to one aspect of the present invention includes a plurality of antennas for transmitting a plurality of beams to a plurality of user apparatuses in accordance with a SDMA (Spatial Division Multiplexing Access) scheme. The base station apparatus includes a reception unit configured to receive a signal indicative of downlink reception signal quality from a user apparatus, a correction unit configured to correct the reception signal quality, a scheduling unit configured to schedule assignment of downlink radio resources based on the corrected reception signal quality, and a transmission unit configured to transmit scheduling information indicative of the assignment of radio resources to the user apparatus. If the reception signal quality is poor, the correction unit corrects the reception signal quality through slight reduction, and if the reception signal quality is good, the correction unit corrects the reception signal quality through significant reduction.

A correction table for determining correspondence between the reception signal quality before the correction and the reception signal quality after the correction is stored in the base station apparatus.

The correction table may be designed for one or more combination of a number, intervals or heights of the plurality of antennas, a beam directivity pattern, an average height of buildings near the base station apparatus, a number of spatial division multiplexing accesses, a number of other users considered in reception quality measurement and a signal demodulation scheme in a user apparatus.

A correction amount of the reception signal quality in the correction unit may be variable depending on a number of retransmissions.

The reception signal quality may be represented in a ratio of desired signal power to undesired signal power or a CQI (Channel Quality Indicator) derived by quantizing the ratio of desired signal power to undesired signal power.

A method according to one aspect of the present invention is used in a base station apparatus including a plurality of antennas for transmitting a plurality of beams to a plurality of user apparatuses in accordance with a SDMA (Spatial Division Multiplexing Access) scheme. The method includes the steps of receiving a signal indicative of downlink reception signal quality from a user apparatus, correcting the reception signal quality, scheduling assignment of downlink radio resources based on the corrected reception signal quality, and transmitting scheduling information indicative of the assignment of radio resources to the user apparatus. If the reception signal quality is poor, the step of correcting comprises correcting the reception signal quality through slight reduction, and if the reception signal quality is good, the step of correcting comprises correcting the reception signal quality through significant reduction.

A method according to one aspect of the present invention is used for generating a correction table used by a base station apparatus to correct downlink reception signal quality reported from a user apparatus. The base station apparatus includes a plurality of antennas for transmitting a plurality of beams to a plurality of user apparatuses in accordance with a SDMA (Spatial Division Multiplexing Access) scheme. The method includes the steps of deriving first reception signal quality obtained at a user apparatus in consideration of a number of interference users, the number of interference users being less than a total number of beams minus one, and second reception signal quality obtained at the user apparatus in consideration of a number of interference users, the number of interference users being equal to the total number of beams minus one, and exploring a distribution state of the second reception signal quality to the first reception signal quality, and determining correspondence for deriving values of the second reception signal quality from values of the first reception signal quality based on the distribution state to generate the correction table.

An apparatus according to one aspect of the present invention is used for generating a correction table used by a base station apparatus to correct downlink reception signal quality reported from a user apparatus. The base station apparatus includes a plurality of antennas for transmitting a plurality of beams to a plurality of user apparatuses in accordance with a SDMA (Spatial Division Multiplexing Access) scheme. The present apparatus derives first reception signal quality obtained at a user apparatus in consideration of a number of interference users, the number of interference users being less than a total number of beams minus one, and second reception signal quality obtained at the user apparatus in consideration of a number of interference users, the number of interference users being equal to the total number of beams minus one, and explores a distribution state of the second reception signal quality to the first reception signal quality, and determines correspondence for deriving values of the second reception signal quality from values of the first reception signal quality based on the distribution state to generate the correction table.

Descriptions are provided below with use of some specific numerical examples in order to facilitate understandings of the present invention, but these numerical values are simply illustrative and any other appropriate value may be used.

First Embodiment

[Generation of CQI Correction Table]

In this embodiment, a user apparatus can employ a common measurement method for reception signal quality in the MU-MIMO scheme and the SU-MIMO scheme. Instead, a base station apparatus uses a CQI correction table to correct CQI measurements reported from the user apparatus into appropriate values. Based on the appropriately corrected CQIs, radio resource assignment and transmission format determination can be conducted appropriately.

The CQIs and the SINR represent amounts different from each other in nature. However, if no confusion may be introduced, they may be equivalently referred to below as a measure representative of reception signal quality. Specifically, the SINR correction table may be referred to as the CQI correction table, and the SINR measurement may be referred to as the CQI measurement. The reception signal quality of the present invention is not limited to the SINR and the CQI and may be represented by any other measure suitable for signal quality.

Figure 2:
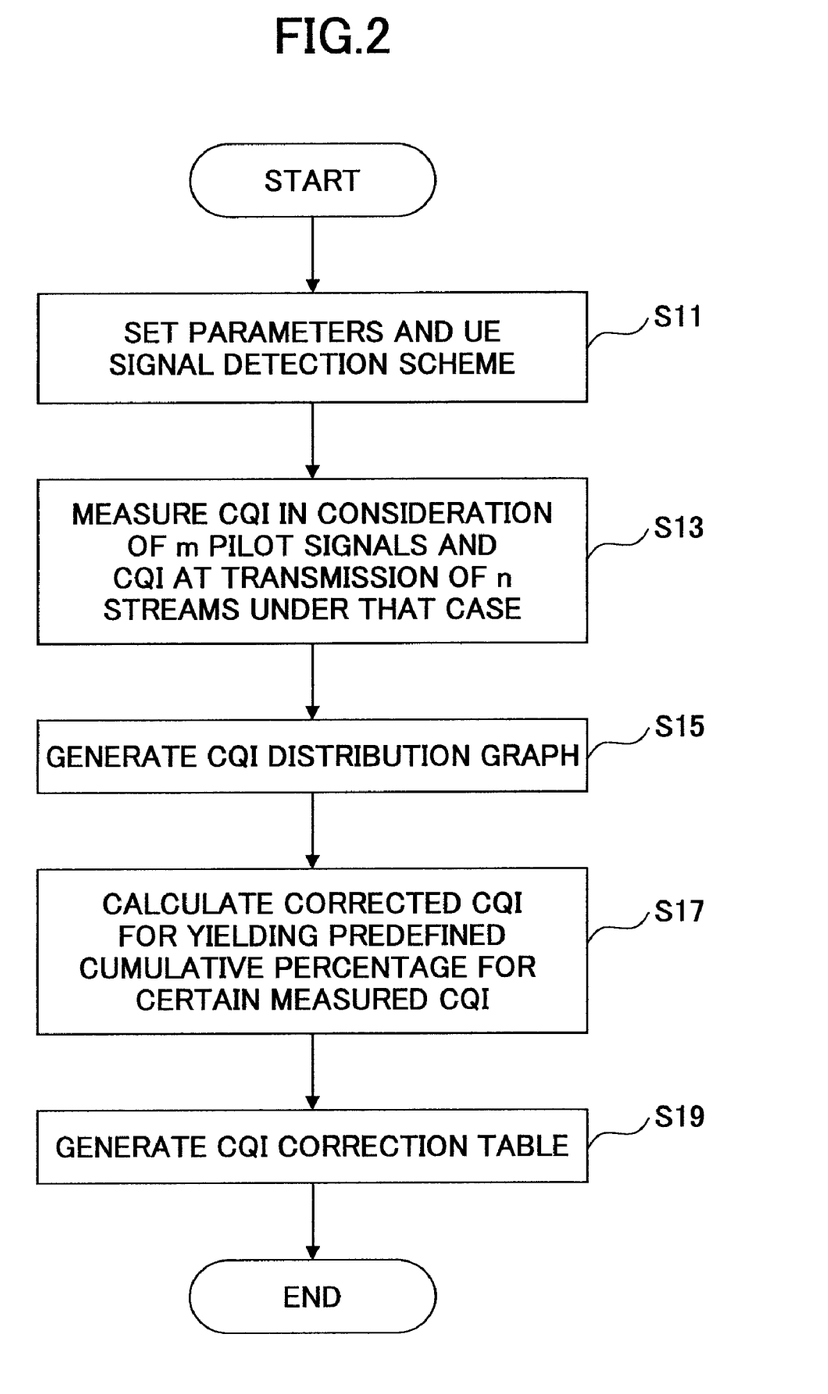
FIG. 2 is a flowchart of a CQI correction table generation according to one embodiment of the present invention.

FIG. 2 is a flowchart of a CQI correction table generation according to one embodiment of the present invention. At step S11, various parameter values are set. These parameters may include the number of antennas provided in a base station apparatus, interval and height of the antennas, a beam directivity pattern, an average height over buildings near the base station apparatus, the number of space division multiple accesses (the total number of beams or the number of simultaneously communicating users), the number of other users considered in the CQI measurement, the number of retransmissions and others. At step S11, a signal detection scheme for a user apparatus is identified. The signal detection scheme may be a ZF (Zero Forcing) scheme, a MMSE (Minimum Mean Square Error) scheme or any other appropriate scheme. The CQI correction table may be generated for one or more combinations of various parameter values set at S11. These combinations are not limited to a single CQI correction table, and any appropriate number of CQI correction tables may be provided.

At step S13, under the setting status at step S11, CQIs measured at a user apparatus and corrected CQIs to be comprehended at the base station apparatus are explored corresponding to different communication states. This exploration may be conducted through simulation or through actual measurement. For convenience sake, it is assumed that the measured CQIs and the corrected CQIs can be obtained through the simulation. The simulation was conducted under setup as follows, the number of antennas in the base station apparatus: 4
the number of antennas in the user apparatus: 2
the number of other users considered at the user apparatus for CQI measurement: 0 (m=1)
the total number of beams transmitted from the base station apparatus: 2 (n=2≠m)
correlation value between the antennas in the base station apparatus: 0.95
signal detection scheme in the user apparatus: MMSE
the number of precoding vector types (code book sizes): 8.

The reception signal quality SINR (measured CQI) measured at a certain user apparatus is formulated as follows, $$SINR = P1/N \quad (B),$$

where P1 represents reception signal power of a desired signal at the user apparatus and N represents a noise component. For the user apparatus, the corrected reception signal quality SINR' (corrected CQI) to be comprehended by the base station apparatus is formulated as follows, $$SINR' = P1/(P2+N) \quad (C),$$

where P2 represents reception signal power of an undesired signal from other users at the desired user. Pilot signals (reference symbols) received at respective two users are orthogonal to each other. For this reason, the reception signal quality of the pilot signals may be evaluated in accordance with the formula (B). However, data signals transmitted in PDSCHs are not orthogonal to different users, and thus evaluation of the data signals in accordance with the formula (B) would be inaccurate. The data signals could have significant influence due to interference signal components from other users, as illustrated in the formula (C). At step S13, the SINR (measured CQI) and the SINR' (corrected CQI) are derived corresponding to various communication states.

At step S15, pairs of the SINR (measured CQI) values and the SINR' (corrected CQI) values derived at step S13 are plotted in a graph to generate a frequency distribution and a distribution graph.

Figure 3:
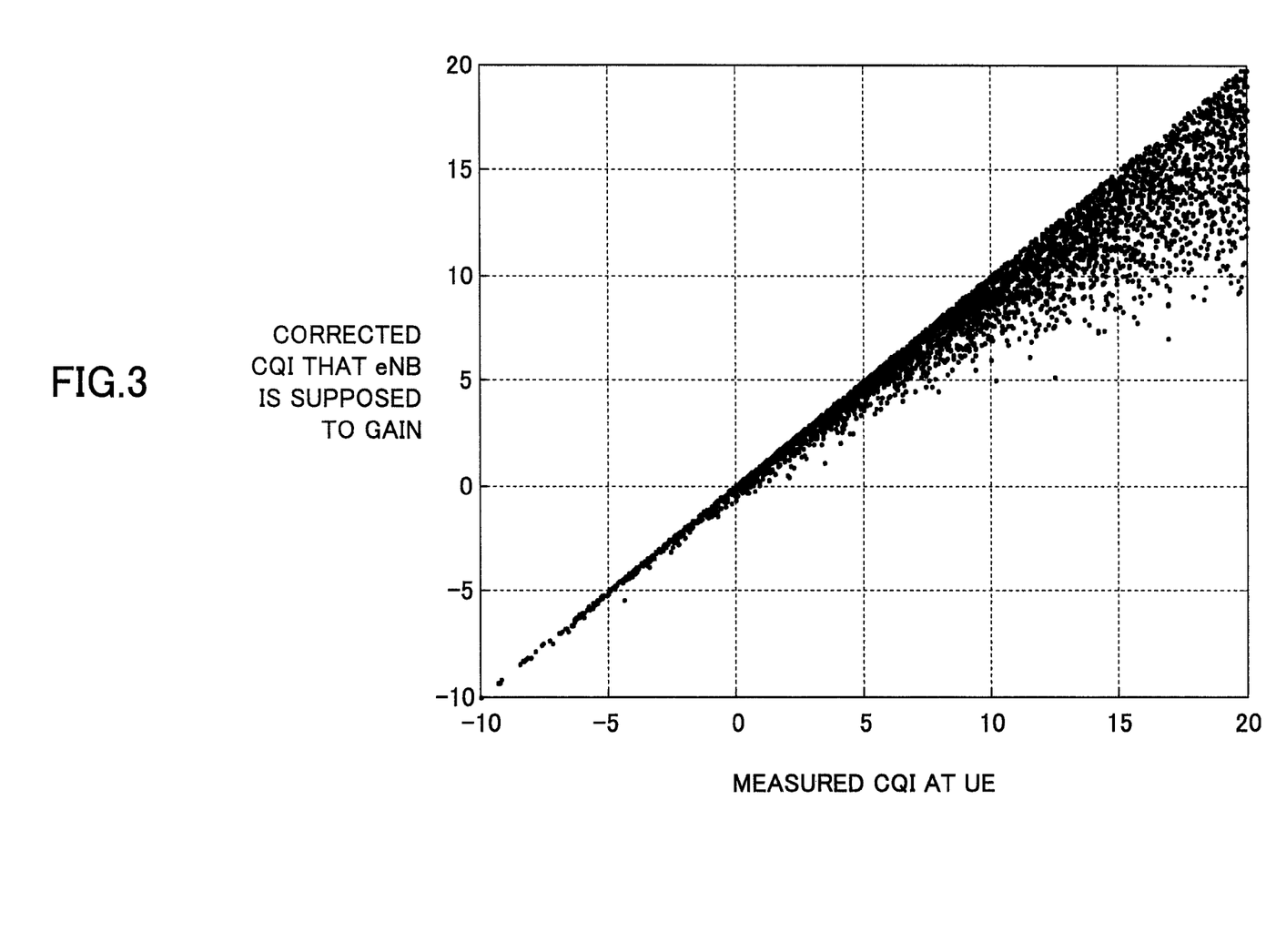
FIG. 3 illustrates an exemplary distribution of measured CQIs and corrected CQIs.

FIG. 3 illustrates an exemplary simulation result of a distribution of the SINR (measure CQI) and the SINR' (corrected CQI). The horizontal axis represents the SINR (measured CQI) measured at a user apparatus in accordance with the formula (B). The vertical axis represents the SINR' (corrected CQI) that a base station apparatus has to comprehend for the user apparatus and is calculated in accordance with the formula (C). If interference due to signals destined for other users can be ignored, the SINR in the formula (B) and the SINR' in the formula (C) may have similar values. This state appears as sampling points along the line corresponding to SINR'=SINR in the illustration. However, as interference with a certain user due to signals destined for other users is greater, the SINR and the SINR' become more different from each other. This may occur in the case where two user apparatuses reside together near the base station apparatus, for example. For this reason, as the SINR is higher (the user apparatus resides closer to the base station apparatus), the SINR' has greater variations. For example, if SINR=20 dB, the SINR' has a wide range between 8 dB and 20 dB (having 12 dB in width). On the other hand, as the SINR is lower (the user apparatus farther resides away from the base station apparatus), the SINR' has smaller variations.

At step 17 in FIG. 2, the corrected CQI (vertical axis) is determined for a certain value of the measured CQI (a certain point on the horizontal axis) such that the value of the cumulative distribution is equal to a predefined value (e.g., 5%). For example, for the SINR of 10 dB in the horizontal axis in FIG. 3, the SINR' ranges between about 5 dB and about 10 dB. It is assumed that the total number of different SINR' values is equal to $N_{ALL}$. In this case, a value Y is determined such that the total number of values below Y dB in the SINR' occupy X % of $N_{ALL}$. In the illustrated example, if X=5%, Y=7.2 dB. Similarly, if the SINR is equal to 15 dB, the SINR' ranges between about 8 dB and about 15 dB, and the total number of different values of the SINR' is assumed to be equal to $N_{ALL}$. In this case, the Y is equal to 9.9 dB such that the total number of values below the Y dB in the SINR' occupy 5% of $N_{ALL}$. For other SINR values, the same calculation is conducted.

Figure 4:
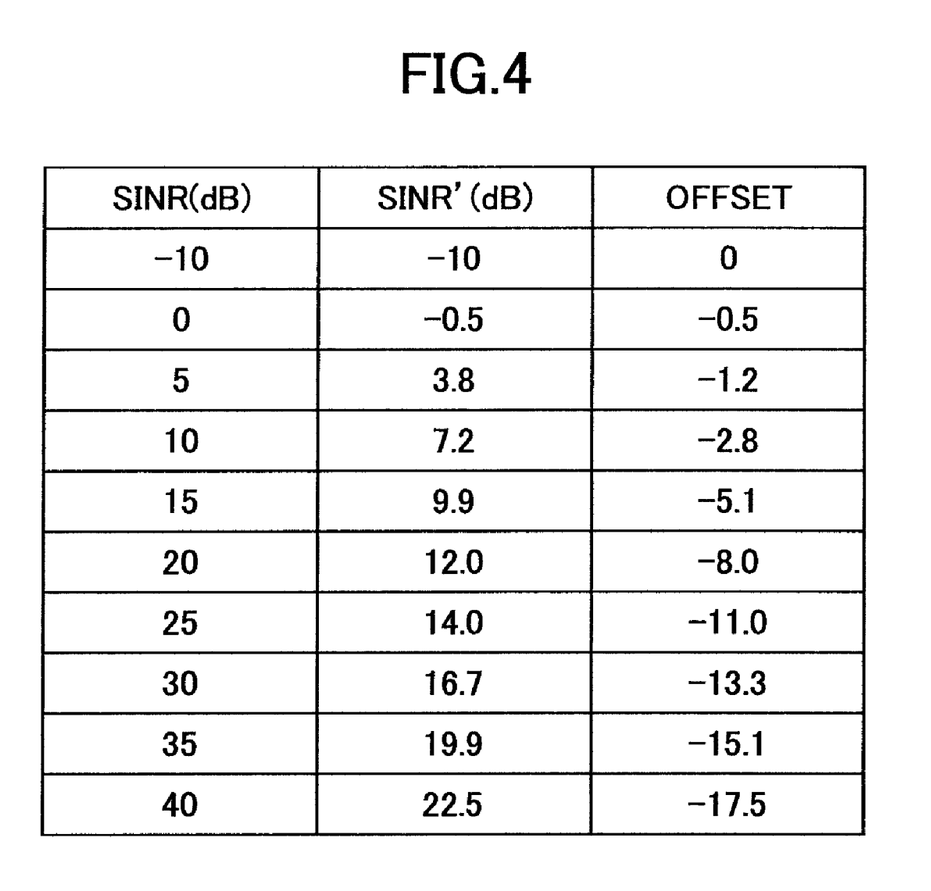
FIG. 4 illustrates an exemplary CQI correction table.

At step S19, correspondence between some SINR values and some Y values being the SINR' values is provided in a CQI correction table as illustrated in FIG. 4. The correspondence represented as the CQI correction table may be represented as a correction curve as illustrated in a solid line in FIG. 5. Such a CQI correction table is provided in a base station apparatus. The base station apparatus uses the CQI correction table to correct the measured CQI reported from a user apparatus into an appropriate value. Then, radio resources are assigned and a transmission format is determined based on the appropriately corrected CQI. In this manner, the user apparatus does not have to modify the CQI measurement scheme due to the base station apparatus correcting the measured CQI appropriately.

In the above embodiment, the cumulative distribution has been employed to derive the correction curve from the SINR distribution. In other embodiments, the correction curve may be derived in any other appropriate manner.

[Variations]

Figure 5:
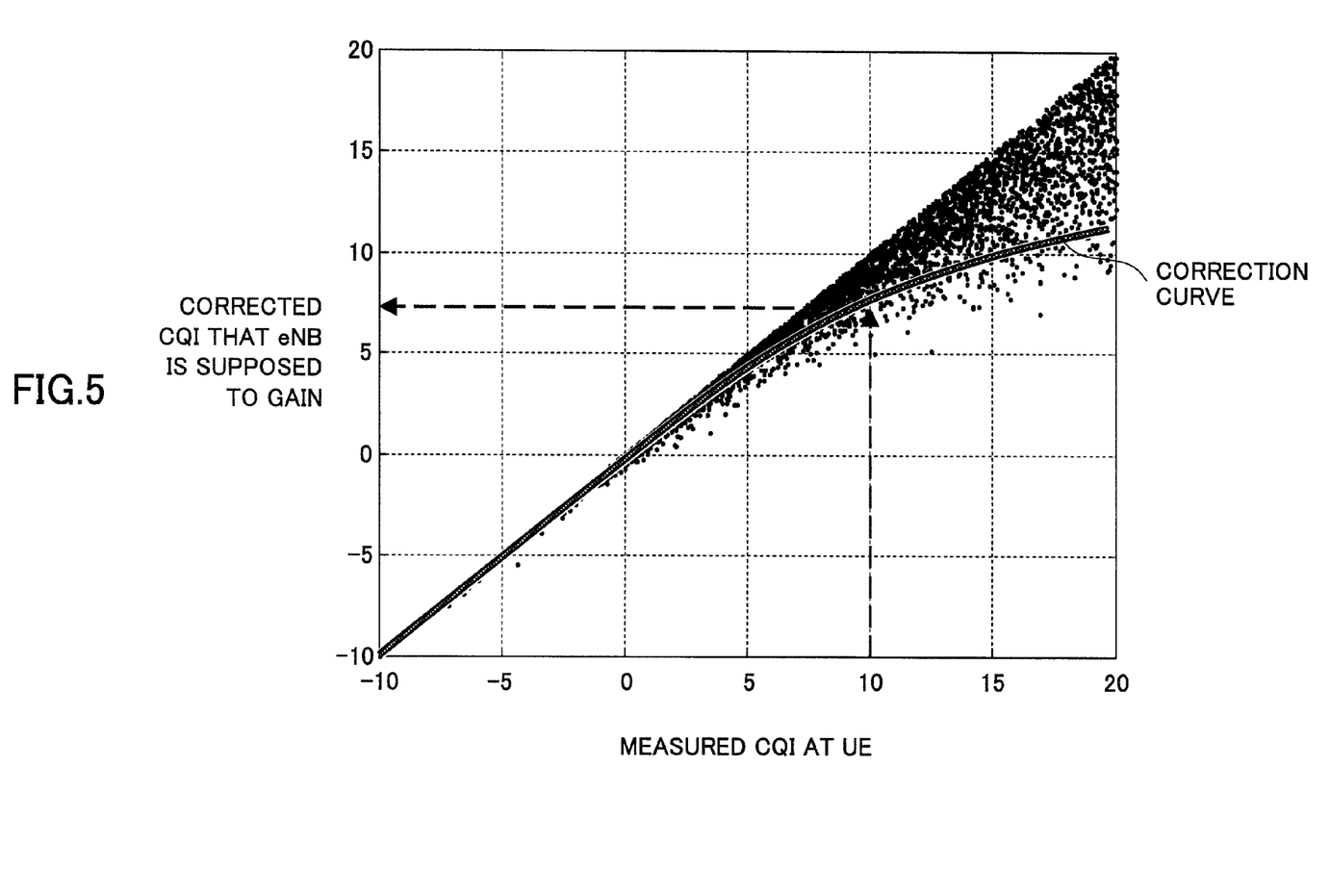
FIG. 5 illustrates an exemplary CQI correction curve.

As illustrated in FIGS. 4 and 5, the measured CQI reported from a user apparatus is corrected in such a manner that if the measured CQI is poor, it is slightly reduced, and otherwise, it is significantly reduced. In other words, the measured CQI is corrected to be poorer. As a result, for example, a transmission format having a lower data rate than that of a transmission format corresponding to the measured CQI reported from the user apparatus is selected so that scheduling can be achieved for more reliable signal transmissions. Alternatively, a higher level of downlink transmission power may be set.

Meanwhile, in this type of mobile communication system, HARQ (Hybrid Automatic Repeat reQuest) is applied for retransmission control. For example, even if an initial packet has been erroneously received, missing the transmitted contents can be avoided by receiving a retransmission packet. In one approach for the retransmission control, some error-detected packets may be discarded. In another more efficient approach, the error-detected packets are combined with the retransmission packets to derive more reliable packets. In the latter approach, the retransmission packets for the second and subsequent transmissions may not have to have as high transmission quality as that of the initial packet. In other words, a transmission format having a higher data rate may be applied, or the retransmissions may be conducted at lower transmission power. The packets preceding the retransmission packets have already conveyed some significant information pieces, although they include errors.

From this standpoint, different CQI correction tables may be applied to the retransmission packets and the preceding packets (typically initial packets). Alternatively, the corrected CQI for the transmission packets may be derived by further modifying the corrected CQI for the preceding packets by Z. In the latter case, for example, the corrected CQI may be further modified by Z represented as $$Z=a\times(\text{measured CQI})+b \quad (D),$$

where "a" and "b" are constant, and either or both of them may be adjusted depending on the number of transmissions. The case of a=b=0 may be defined as that for the initial packets. The adjustment is not limited to the formula (D), but any other appropriate adjustment amount may be applied. In consideration of the property that better measured CQI (horizontal axis) may lead to a wider distribution of the corrected CQI (vertical axis), the larger Z is preferably applied for the better measured CQI (horizontal axis).

Figure 6:
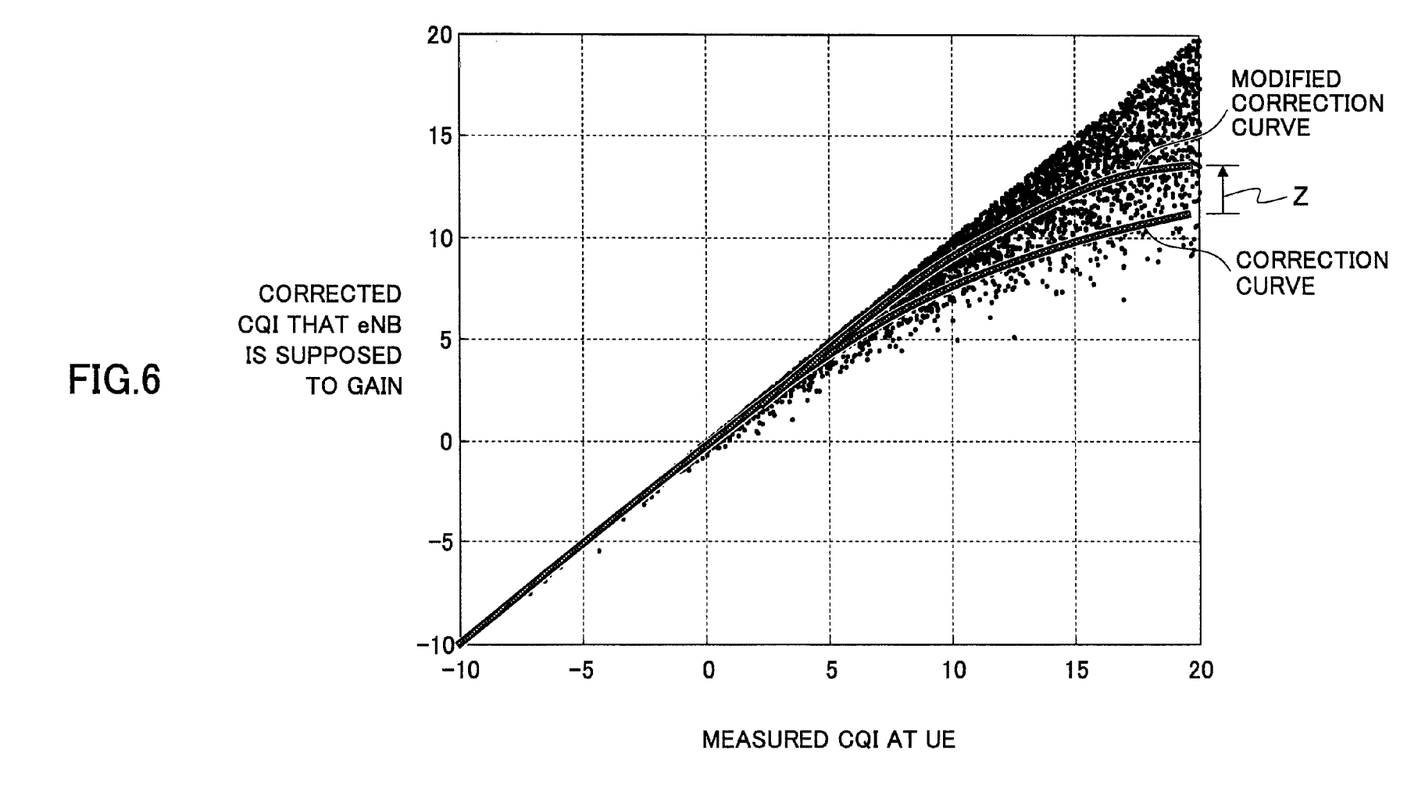
FIG. 6 illustrates a correction curve for deriving corrected CQIs for retransmitted packets through modification of corrected CQIs for preceding packets by Z.

FIG. 6 illustrates an exemplary correction curve and a CQI correction curve resulting from addition of Z represented in the formula (D) to the correction curve. Corrected amounts for the measured CQI are adjusted depending on the number of retransmission, which can prevent the retransmission packets from being transmitted at excessive quality. The measured CQI used for preceding packets is modified by some value of Z, and thus the measured CQI for retransmission packets does not have to be separately reported.

[Base Station Apparatus]

Figure 7:
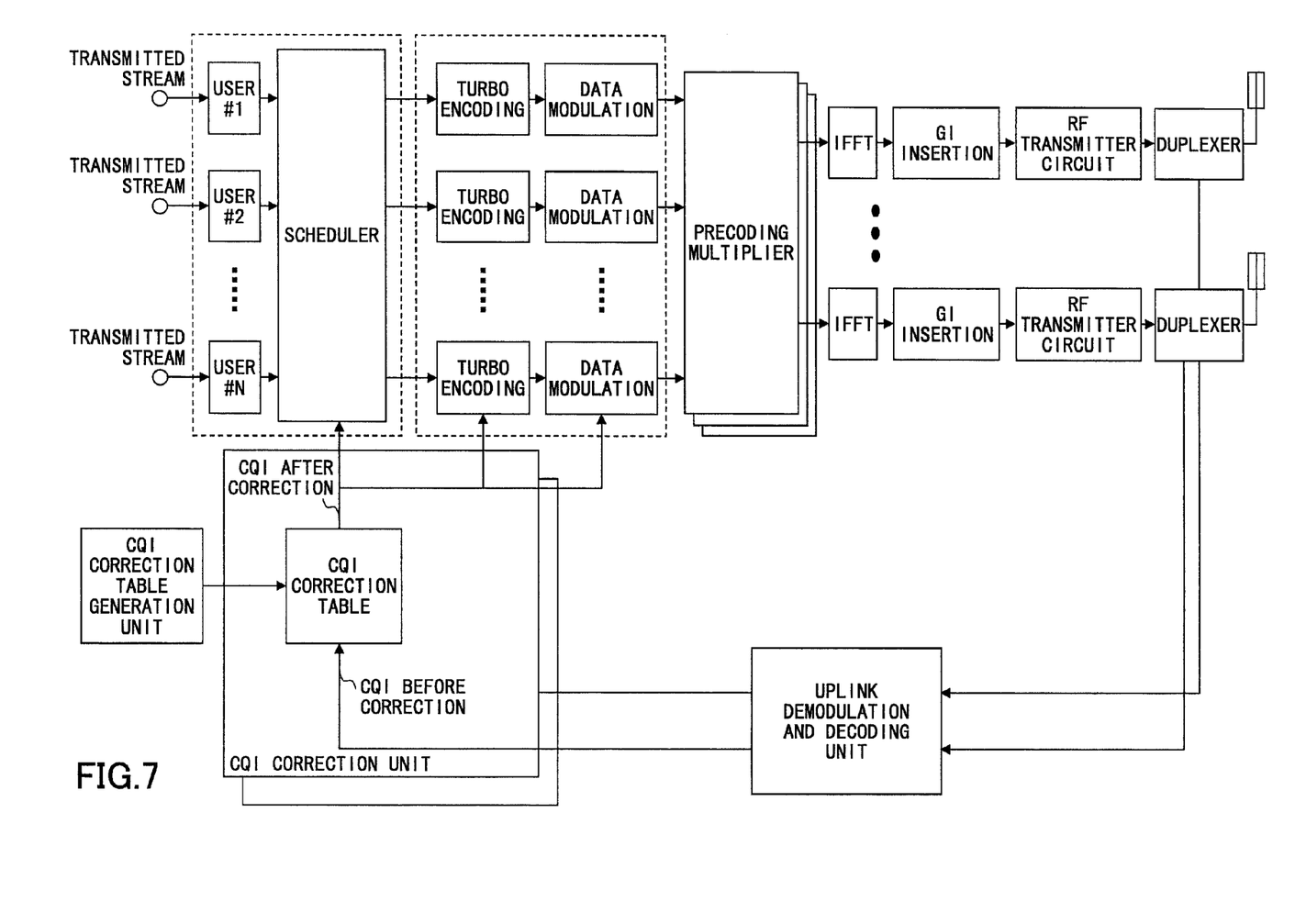
FIG. 7 illustrates a base station apparatus according to one embodiment of the present invention.

FIG. 7 illustrates an exemplary base station apparatus according to one embodiment of the present invention. In FIG. 7, transmission buffers #1-#N provided for respective users, a scheduler, turbo encoding units and data modulation units provided for the respective users, precoding multipliers provided corresponding to the number of antennas, IFFT units, GI insertion units, RF transmitter circuits and duplexers provided for the respective antennas, an uplink signal demodulation and decoding unit, a CQI correction unit and a CQI correction table are illustrated.

The transmission buffers #1-#N receive transmission streams to be transmitted to user apparatuses and store them for subsequent transmissions.

The scheduler generates scheduling information indicative of assignment plans of radio resources and extract data from the transmission buffers in accordance with the assignment plans.

The turbo encoding units channel-encode transmission signals in accordance with specified transmission formats. Although the encoding may be conducted in accordance with any appropriate scheme, a turbo encoding scheme is applied in this embodiment.

The data modulation units data-modulate transmission signals in accordance with specified transmission formats.

The precoding multipliers map downlink signals in accordance with the scheduling information, copy signals destined for the respective user apparatuses to generate a number of copied signals corresponding to the number of antennas, and weight the respective copied signals with a precoding vector.

The IFFT units perform inverse fast Fourier transform on incoming signals and modulate the resulting signals in accordance with OFDM (Orthogonal Frequency Division Multiplexing) scheme to generate effective symbol parts.

The GI insertion units generate guard intervals based on a portion of the effective symbol parts and add them to the effective symbol parts to generate baseband OFDM symbols.

The RF transmitter circuits convert the OFDM symbols into transmission symbols that can be transmitted in radio signals.

The duplexers connect the antennas to the transmitting side or the receiving side for transmission and reception switch.

The uplink signal demodulation and decoding unit demodulates and decodes uplink received signals to restore control signals and data signals. Particularly in the present invention, the measured CQIs reported from user apparatuses are extracted from the received signals.

The CQI correction unit uses the CQI correction table to convert the measured CQIs into corrected CQIs. Based on the corrected CQIs, the radio resource assignment plans and the transmission formats are determined. In accordance with the determined assignment plans and transmission formats, the data extraction and output by the scheduler, the channel encoding by the turbo encoding units and the data modulation by the data modulation units are carried out.

The CQI correction table generation unit performs operations as described in conjunction with FIG. 2 to generate the CQI correction tables. The CQI correction table is essential to the base station apparatus, but the CQI correction table generation unit is not essential to the base station apparatus. The CQI correction table generation unit may be implemented in any appropriate simulator.

The present invention has been described with reference to the specific embodiments, but the embodiments are simply illustrative and variations, modifications, alterations and substitutions could be contrived by those skilled in the art. The embodiments or the sections are separated for convenience sake, and some of the embodiments or some subject matter described in the sections may be combined. In the above description, some specific numerical values are used for better understanding of the present invention. Unless specifically indicated, however, these numerical values are simply illustrative and any other suitable values may be used. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2007-258112 filed on Oct. 1, 2007, the entire contents of which are hereby incorporated by reference.

The invention claimed is:

1. A base station apparatus including a plurality of antennas for transmitting a plurality of beams to a plurality of user apparatuses in accordance with a SDMA (Spatial Division Multiplexing Access) scheme, comprising:
   a reception unit configured to receive a signal indicative of downlink reception signal quality from a user apparatus;
   a correction unit configured to correct the reception signal quality based on a correspondence between first reception signal quality obtained at the user apparatus in consideration of a number of interference users, the number of interference users being less than a total number of beams minus the number of beams for desired user, and second reception signal quality obtained at the user apparatus in consideration of a number of interference users, the number of interference users being equal to the total number of beams minus the number of beams for desired user;
   a scheduling unit configured to schedule assignment of downlink radio resources based on the corrected reception signal quality; and
   a transmission unit configured to transmit scheduling information indicative of the assignment of radio resources to the user apparatus,
   wherein if the reception signal quality is poor, the correction unit corrects the reception signal quality through slight reduction, and if the reception signal quality is good, the correction unit corrects the reception signal quality through significant reduction.

2. The base station apparatus as claimed in claim 1, wherein a correction table for determining correspondence between the reception signal quality before the correction and the reception signal quality after the correction is stored in the base station apparatus.

3. The base station apparatus as claimed in claim 1, wherein the correction table is designed for one or more combinations of a number, intervals or heights of the plurality of antennas, a beam directivity pattern, an average height of buildings near the base station apparatus, a number of spatial division multiplexing accesses, a number of other users considered in reception quality measurement and a signal demodulation scheme in a user apparatus.

4. The base station apparatus as claimed in claim 1, wherein a correction amount of the reception signal quality in the correction unit is variable depending on a number of retransmissions.

5. The base station apparatus as claimed in claim 1, wherein the reception signal quality is represented in a ratio of desired signal power to undesired signal power.

6. The base station apparatus as claimed in claim 1, wherein the reception signal quality is represented in a CQI (Channel Quality Indicator) derived by quantizing a ratio of desired signal power to undesired signal power.

7. A method for use in a base station apparatus including a plurality of antennas for transmitting a plurality of beams to a plurality of user apparatuses in accordance with a SDMA (Spatial Division Multiplexing Access) scheme, the method comprising:

receiving a signal indicative of downlink reception signal quality from a user apparatus;

correcting the reception signal quality based on a correspondence between first reception signal quality obtained at the user apparatus in consideration of a number of interference users, the number of interference users being less than a total number of beams minus the number of beams for desired user, and second reception signal quality obtained at the user apparatus in consideration of a number of interference users, the number of interference users being equal to the total number of beams minus the number of beams for desired user;

scheduling assignment of downlink radio resources based on the corrected reception signal quality; and transmitting scheduling information indicative of the assignment of radio resources to the user apparatus, wherein if the reception signal quality is poor, the step of correcting comprises correcting the reception signal quality through slight reduction, and if the reception signal quality is good, the step of correcting comprises correcting the reception signal quality through significant reduction.

* * * * *